(12) United States Patent
Lawrence

(10) Patent No.: US 7,381,229 B2
(45) Date of Patent: Jun. 3, 2008

(54) SYSTEM FOR REACTING FUEL AND AIR INTO REFORMATE

(75) Inventor: Jeremy Lawrence, Neubrandenburg (DE)

(73) Assignee: Enerday GmbH, Stockdorf (DE)

( * ) Notice: Subject to any disclaimer, the term of this patent is extended or adjusted under 35 U.S.C. 154(b) by 587 days.

(21) Appl. No.: 11/006,730

(22) Filed: Dec. 8, 2004

(65) Prior Publication Data

US 2005/0120627 A1 Jun. 9, 2005

(30) Foreign Application Priority Data

Dec. 9, 2003 (DE) ................ 103 57 474

(51) Int. Cl.
*B01J 7/00* (2006.01)
(52) U.S. Cl. .................. 48/61; 48/127.9; 48/198.1; 261/18.1; 261/66
(58) Field of Classification Search .................. 48/61, 48/127.9, 198.1; 422/224; 431/183; 261/18.1, 261/66
See application file for complete search history.

(56) References Cited

U.S. PATENT DOCUMENTS

| 3,607,419 | A | * | 9/1971 | Keating, Jr. .................. 429/17 |
| 4,074,661 | A | * | 2/1978 | Noguchi et al. ................ 123/3 |
| 4,122,802 | A | * | 10/1978 | Noguchi et al. ................ 123/3 |
| 5,997,596 | A | * | 12/1999 | Joshi et al. .................. 48/198.1 |
| 6,123,542 | A | * | 9/2000 | Joshi et al. .................. 431/183 |
| 7,108,838 | B2 | * | 9/2006 | McGee .................. 422/224 |
| 2003/0122266 | A1 | * | 7/2003 | Nau et al. .................. 261/18.1 |
| 2003/0143506 | A1 | * | 7/2003 | Hubbauer et al. .......... 431/351 |
| 2006/0042565 | A1 | * | 3/2006 | Hu .................. 123/3 |

FOREIGN PATENT DOCUMENTS

JP 2004-284891 * 10/2004
WO WO 03/022424 A1 3/2003

* cited by examiner

*Primary Examiner*—N. Bhat
(74) *Attorney, Agent, or Firm*—David S. Safran

(57) ABSTRACT

A system for reacting fuel and air into reformate, with a reformer (10) which has a reaction space (12), a nozzle (14) which at least in part is formed as a Venturi nozzle for supply of a fuel/air mixture to the reaction space (12), the Venturi nozzle part has a small diameter area (16) from which a diffuser extends to the reaction space. A first gas supply means (20) is provided on the side of the small diameter area which side faces away from the diffuser, and second gas supply means (26, 28) are provide at the small diameter area. A fuel supply (22) is also provided for supplying fuel to the nozzle and it preferably extends along the longitudinal axis of the nozzle.

12 Claims, 1 Drawing Sheet

SYSTEM FOR REACTING FUEL AND AIR INTO REFORMATE

BACKGROUND OF THE INVENTION

1. Field of Invention

The invention relates to a system for reacting fuel and air into reformate, with:
a reformer which has a reaction space,
a nozzle which is made at least in sections in the manner of a Venturi nozzle for supplying a fuel/air mixture to the reaction space, the section of the nozzle which is made in the manner of a Venturi nozzle having:
an area with an extremely small diameter,
a diffuser which extends between the area with the extremely small diameter and the reaction space and
first gas supply means on the side of the area with the extremely small diameter, which side faces away from the diffuser, and
a fuel supply for supplying fuel to the nozzle.

2. Description of Related Art

A system of the type noted above is known from published International Patent Application WO 03/022424. These systems are used to convert chemical energy into electrical energy. For this purpose, fuel and air, preferably in the form of a fuel/air mixture, are supplied to the reformer. The reaction of the fuel with atmospheric oxygen takes place in the reformer, preferably the process of partial oxidation being carried out.

SUMMARY OF THE INVENTION

The reformate which has been produced in this way is then supplied to a fuel cell or a fuel cell stack, electrical energy being released by controlled reaction of hydrogen as a component of the reformate, and oxygen.

As already mentioned, the reformer can be designed such that the process of partial oxidation is carried out in order to produce reformate. In this case, when using diesel as fuel, it is especially useful to carry out preliminary reactions before partial oxidation. In this way, long-chain diesel molecules can be reacted into short-chain molecules with a "cold flame"; this ultimately benefits reformer operation. In general, the reaction zone of the reformer is supplied with a gas mixture which is reacted into $H_2$ and CO. Another component of the reformate is $N_2$ from the air, and depending on the air ratio and the temperature, optionally, $CO_2$, $H_2O$ and $CH_4$. In normal operation, the fuel mass flow is adjusted according to the required output, and the air mass flow is adjusted to an air ratio in the region of $\lambda=0.4$. The reforming reaction can be monitored by different sensors, for example, temperature sensors and gas sensors.

In addition to the process of partial oxidation, it is likewise possible to carry out autothermal reforming. The process of partial oxidation, in contrast to autothermal reforming, is induced by oxygen being substoichiometrically supplied. For example, the mixture has an air ratio of $\lambda=0.4$. The partial oxidation is therefore exothermal, so that unwanted heating of the reformer can occur in a problematic manner. Furthermore, partial oxidation tends to increased soot formation. To prevent soot formation, the air ratio $\lambda$ can be chosen to be smaller. This is achieved such that part of the oxygen used for oxidation is made available by water vapor. Since oxidation proceeds endothermally with water vapor, it is possible to adjust the ratio between the fuel, oxygen and water vapor such that altogether heat is neither released nor is heat consumed. Autothermal reforming which is achieved in this way therefore eliminates the problems of soot formation and undesirable overheating of the reformer.

It is likewise possible for other steps of gas treatment to take place following oxidation in the reformer, and especially methanation can be downstream of partial oxidation.

One current fuel cell system is, for example, a PEM (proton exchange membrane) system which can typically be operated at operating temperatures between room temperature and roughly 100° C. Due to the low operating temperatures, this fuel cell type is often used for mobile applications, for example in motor vehicles.

Furthermore, high temperature fuel cells are known, so-called SOFC systems ("solid oxide fuel cell"). These systems work, for example, in the temperature region of roughly 800° C., a solid electrolyte (solid oxide) being able to take over transport of oxygen ions. The advantage of these high temperature fuel cells compared to PEM systems consists especially in durability relative to mechanical and chemical loads.

Besides stationary applications, one application for fuel cells in conjunction with generic systems includes especially applications in the motor vehicle domain, for example, as an auxiliary power unit (APU).

SUMMARY OF THE INVENTION

A primary object of the present invention is to develop systems of the above mentioned type such that their efficiency is improved, especially by enabling recovery of water and hydrogen from the anode exhaust gas of a fuel cell stack.

This object is achieved by a second gas supply means being provided in the area of the Venturi with the extremely small diameter.

Because, in system in accordance with the invention, there are two gas supply means, it is possible, for example, to introduce air via one gas supply means and anode exhaust gas via the other gas supply means. Although the supply of anode exhaust gas is considered especially advantageous for recovery of water and hydrogen, the invention also comprises embodiments in which, for example, air is introduced via one gas supply means, while some suitable gas is supplied via the other gas supply means.

However, in especially preferred embodiments of the system of the invention, it is provided that the second gas supply means are intended for supplying the anode exhaust gas of a fuel cell stack. In this way, the at least partial recovery of water and hydrogen from the anode exhaust gas, which has already been repeatedly mentioned, is enabled.

Furthermore, it is considered advantageous that the second gas supply means comprise at least one opening in the area with the extremely small diameter. Due to the pressure conditions which arise in the nozzle, in the area of the opening, there is suction so that the gas which has been supplied via the second gas supply means is entrained by the flow in the nozzle.

In this connection, it is considered especially advantageous that the second gas supply means comprise at least two openings in the area with the extremely small diameter, the at least two openings being connected by a channel which is provided outside the nozzle. The channel which is provided outside the nozzle is suitably connected to the respective gas source, for example, to the anode side of a fuel cell stack, via suitable connecting line means.

Furthermore, it is preferred that the first gas supply means are designed to supply air. For example, the first gas supply means can comprise a chamber which is suitably connected to the nozzle section and which also is suitably connected to an air channel.

A likewise especially preferred development of the invention calls for the fuel supply to have at least one fuel outlet which is located between the area with the extremely small diameter and the reaction space. Here, it is especially preferred that the fuel outlet is spaced away from the area with the extremely small diameter such that the flow conditions in this area are not adversely affected in a disadvantageous manner.

It is likewise considered advantageous for the fuel supply to have at least one fuel outlet which is located in the area of the lengthwise axis of the nozzle. Such an arrangement of the fuel outlet yields especially good mixing of the fuel and of the gas or gas mixture which flows through the nozzle.

In this connection, especially embodiments are considered in which it is provided that the fuel supply comprises at least one injection means. The injection means can be, for example, an injection valve or a spray nozzle.

In particular, in this connection, it is also possible for the fuel supply to comprise a fuel line which extends through the opening of the nozzle. The fuel line extends preferably through the opening in a sealed manner. The fuel line can either be made such that it influences flow in the nozzle as little as possible, but also such that it actively causes the desired flow properties.

Furthermore, embodiments are possible in which it is provided that sections of the fuel supply extend through the area with the extremely small diameter. In this case, the area with the extremely small diameter can be designed advantageously to be somewhat larger since, due to the fuel supply which is routed through this area, an annular passage area results. The fuel supply can be made, for example, in the manner of a pipe, especially a pipe which can be moved in the lengthwise direction of the nozzle. In the latter case, it is possible to make the fuel outlet movable on the lengthwise axis of the nozzle.

According to another important basic idea of the invention, it is provided that the diffuser is connected directly to the reaction space. This approach is especially advantageous because, in the prior art, there often had to be transition pieces between the diffuser output and the reformer input, in particular, to match the diameter of the diffuser output to the diameter of the reformer input. These intermediate pieces can cause undesirable pressure losses. Furthermore, these intermediate pieces increase the overall dimensions and the overall weight; this is especially disadvantageous in mobile applications.

In the above explained connection, it is especially preferred that the diffuser has a continuously widening diameter. A continuously widening geometry of the diffuser prevents especially undesirable pressure stages or flow separations.

In many cases, good flow and mixing ratios are achieved when it is provided that the diffuser has a linearly widening diameter. This leads to a diffuser which widens in the manner of a funnel, the output diameter of the diffuser in an especially advantageous manner being matched to the input diameter of the reformer input.

Furthermore, it is preferred that the reformer, the nozzle, and the fuel supply form an assembly. This assembly leads to an especially compact structure; this greatly facilitates system integration.

Preferred embodiments of the invention are explained below by way of example with reference to the accompanying drawings.

DETAILED DESCRIPTION OF THE INVENTION

Figure 1:
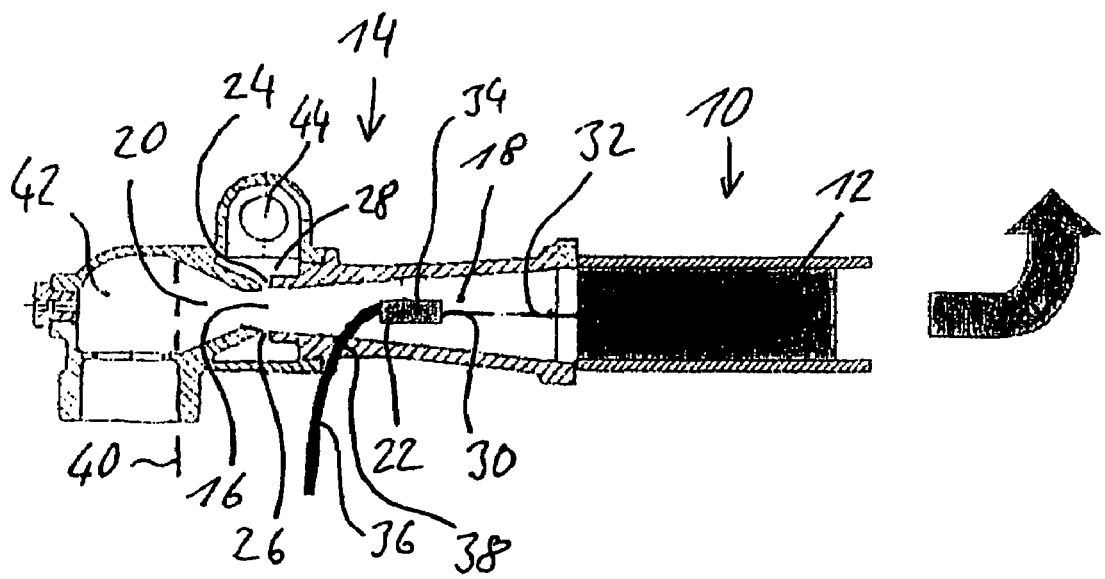
FIG. 1 is a schematic cross-sectional view of a first embodiment of the system in accordance with the invention.

The embodiment of the system of the invention shown in FIG. 1 for reacting fuel and air into reformate comprises a reformer 10 which has a reaction space 12, a nozzle 14 for supplying a fuel/air mixture to the reaction space 12, and a fuel supply 22 for supplying fuel to the nozzle 14. In the figure, to the right of the broken line 40, the nozzle 14 is made in the manner of a Venturi nozzle. This section of the nozzle 14 which is made in the manner of a Venturi nozzle has an area 16 in which the diameter of the nozzle 14 is extremely small. A diffuser 18 extends between the small diameter area 16 and the reformer 10. In the illustrated embodiment, the diffuser 18 has a linearly widening diameter, the outlet diameter of the diffuser 18 agreeing with the input diameter of the reaction space 12. For this reason, the need for any adapter pieces between the nozzle 14 and the reformer 10 is eliminated; this enables the system to have a compact structure. Moreover, pressure losses and flow separations are avoided by this geometry.

A first gas supply means 20 is formed by the nozzle to the left of the small diameter area 16 and is connected to a chamber 42 which is located to the left of the broken line 40. In this case, air as the first gas is supplied via the chamber 42. In the small diameter area 16, there are a first opening 24 and a second opening 26, these openings 24, 26 form the second gas supply means 26, 28. The first opening 24 and the second opening 26 are connected by a channel 28 which has a connection 44. In this case, the connection 44 is designed to be connected in a suitable manner to the anode side of a fuel cell stack so that anode exhaust gas can be supplied to the openings 24, 26 via the channel 28. It is pointed out that, in the small diameter area 16, a suction prevails which facilitates inflow of anode exhaust gas as the second gas via the openings 24, 26. Recycling of the anode exhaust gas is advantageous since the water contained in it and the hydrogen contained in it can be at least partially recovered by the reformation process.

In the embodiment shown in FIG. 1, the fuel supply 22 comprises an injection means 34, for example a diesel injection nozzle, with one fuel outlet 30. The injection means 34 with the fuel outlet 30 in this case is located on the lengthwise axis of the nozzle 14, which axis is labeled 32, and is spaced apart from the small diameter area 16, such that flow in the nozzle is not influenced in an unduly disadvantageous manner. In the illustrated case the injection means 34 is located roughly in the middle between the area 16 with the extremely small diameter and the output of the diffuser 18 or the input of the reaction space 12. The injection means 34 is connected to a fuel line 36 which is routed through the opening 38 in the nozzle 14, sealed. The reformate which is produced in the reaction space 12 from the air, the anode exhaust gas and the fuel is supplied to a fuel cell stack (not shown), as indicated by the arrow.

Figure 2:
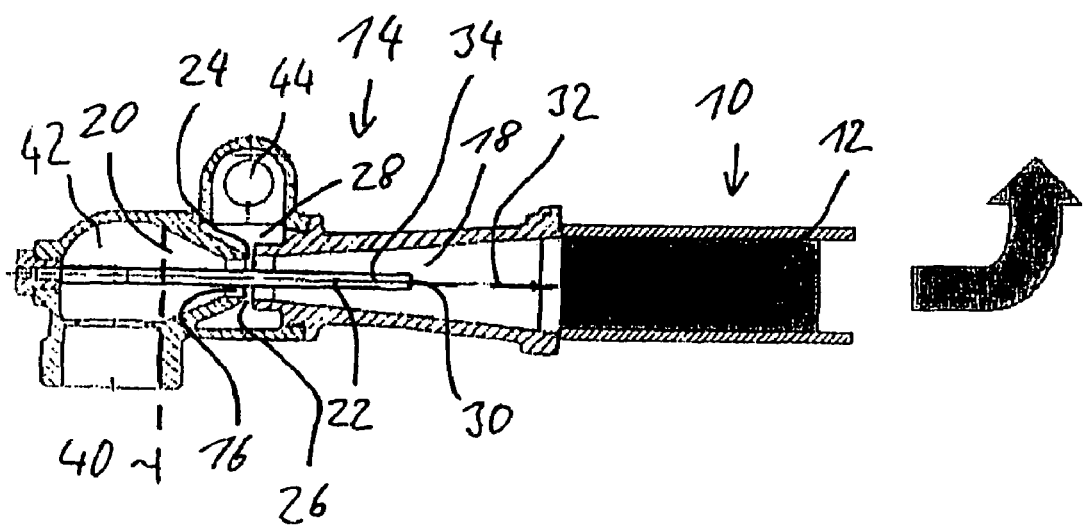
FIG. 2 is a schematic cross-sectional view of a second embodiment of the system in accordance with the invention.

The embodiment of the system of the invention which is shown in FIG. 2 is distinguished from the embodiment as shown in FIG. 1 by the design of the fuel feed 22. In the embodiment shown in FIG. 2, the fuel supply 22 comprises a tubular injection element 34 which extends through the small diameter area 16 so that, in the area small diameter 16, an annular passage geometry is formed. The tubular or rod-shaped injection means 34 has a fuel outlet 30 which lies on the lengthwise axis 32 of the nozzle 14. In this case, the fuel supply 22 extends through the chamber 42, and it can be provided that the entire fuel supply 22 can be moved in the axial lengthwise direction of the nozzle 14 so that the fuel outlet 30 can be moved back and forth on the lengthwise axis 32, for example, in order to optimize the mixing action which is achieved in the diffuser 18 for different operating states. Otherwise, reference is made to the description of FIG. 1.

In many cases, it is possible to design the small diameter area 16 to be smaller in the embodiment corresponding to FIG. 1 than in the embodiments corresponding to FIG. 2. Furthermore, the opening angle of the diffuser 18 in the embodiments corresponding to FIG. 2 can be chosen to be smaller; this leads to a higher coefficient of expansion. In addition or alternatively, the diffuser in the embodiments according to FIG. 2 can be designed to be shorter; this reduces the entire length of the system and its volume.

Due to the compact structure of the system of the invention, which becomes possible especially as a result of the elimination of the need for adapter pieces between the diffuser and the reformer, volume and mass can be saved; this is especially advantageous in mobile applications. The continuous, especially uniform widening of the diffuser contributes to the fact that means for alignment of the flow between the nozzle 14 and the reformer 10 can also be eliminated. Overall, pressure losses are reduced and the recirculation rate can be increased; this increases the efficiency of the system in accordance with the invention.

The features of the invention disclosed in the above description, in the drawings and in the claims can be important both individually and also in any combination for implementation of the invention.

What is claimed is:

1. System for reacting fuel and air into reformate, comprising:
    a reformer having a reaction space,
    a nozzle, which is formed at least in part as a Venturi nozzle, for supplying a fuel/air mixture to the reaction space, the Venturi nozzle having a small diameter area,
    a diffuser which extends between the small diameter area and the reaction space,
    first gas supply means on a side of the small diameter area which side faces away from the diffuser,
    a fuel supply for supplying fuel to the nozzle, and
    second gas supply means at the small diameter area wherein the second gas supply means comprise at least two openings at the small diameter area, the at least two openings being connected by a channel which is provided outside of the nozzle.

2. System as claimed in claim 1, wherein the second gas supply means are adapted to supply anode exhaust gas of a fuel cell stack.

3. System as claimed in claim 1, wherein the first gas supply means are adapted for supplying air.

4. System as claimed in claim 1, wherein the fuel supply has at least one fuel outlet which is located between the small diameter area and the reaction space.

5. System as claimed in claim 1, wherein the fuel supply has at least one fuel outlet which is located in the area of the lengthwise axis of the nozzle.

6. System as claimed in claim 1, wherein the fuel supply comprises at least one injection means.

7. System as claimed in claim 1, wherein the fuel supply has a fuel line which extends through an opening of the nozzle.

8. System as claimed in claim 1, wherein the fuel supply extends through the small diameter area.

9. System as claimed in claim 1, wherein the diffuser is connected directly to the reaction space.

10. System as claimed in claim 1, wherein the diffuser has a continuously widening diameter.

11. System as claimed in claim 10, wherein the diffuser has a linearly widening diameter.

12. System as claimed in claim 1, wherein the reformer, the nozzle, and the fuel supply form an assembly.

* * * * *